Dec. 31, 1963     B. L. KRAVER     3,115,764
AUTOMOBILE HOOD LOCK
Filed Feb. 19, 1962
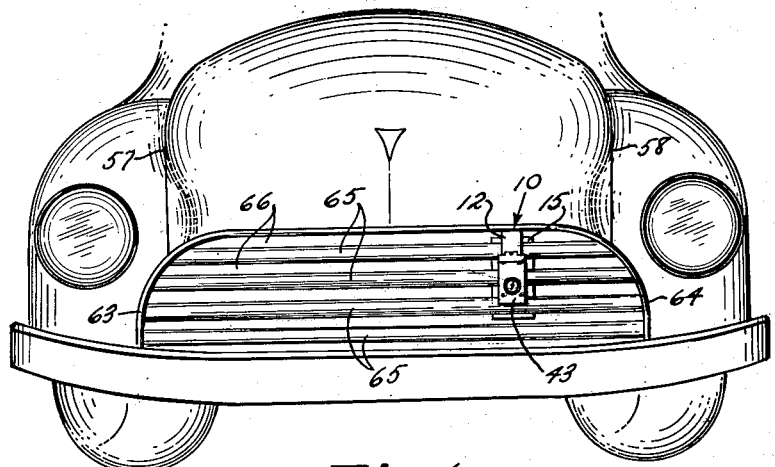
Fig.1
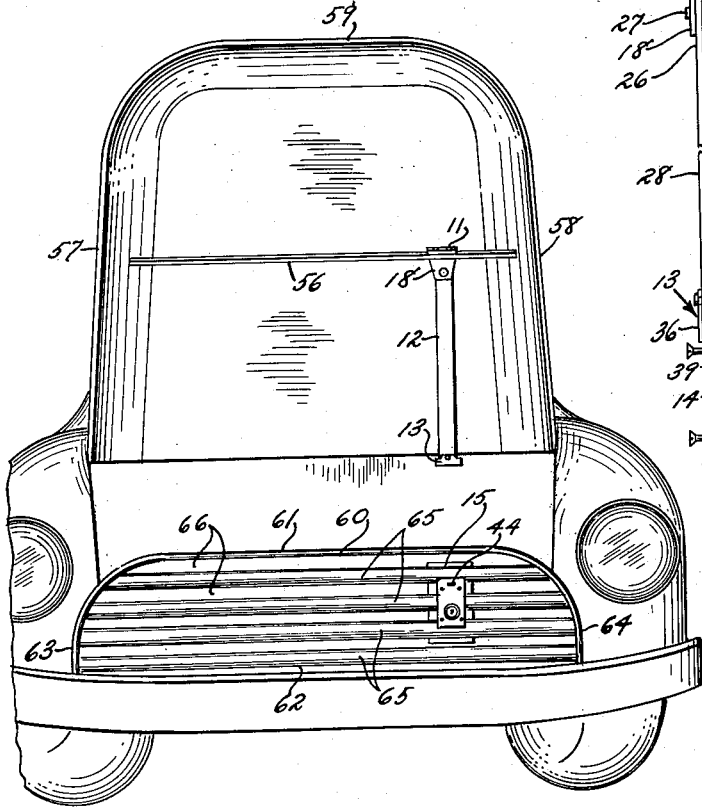
Fig.2
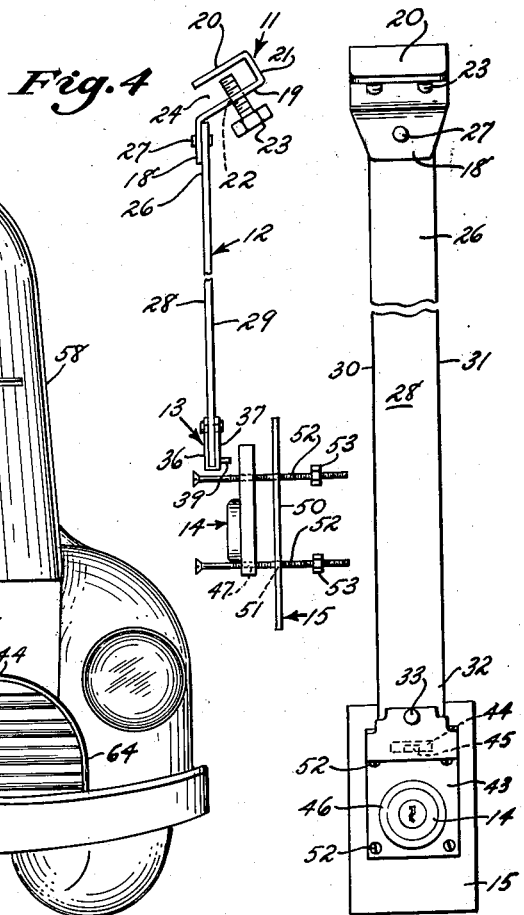
Fig.4
Fig.3

United States Patent Office 3,115,764
Patented Dec. 31, 1963

3,115,764
AUTOMOBILE HOOD LOCK
Barnett L. Kraver, 132 Monroe St., Brooklyn 16, N.Y.
Filed Feb. 19, 1962, Ser. No. 174,189
1 Claim. (Cl. 70—240)

This invention relates generally to the field of automotive accessories, and more particularly to an improved hood lock suitable for use in locking automobile hoods of the type which are hingedly associated at the rearward edge thereof with the cowl portion of an automobile body.

Hoods of this type comprise the substantial majority of automobile hoods manufactured during the past few years, such devices being presently manufactured, in most cases, without the previously used cable-actuated locking means operated from within the body of the automobile, such devices having proved to be costly to manufacture, and increasingly unreliable in operation over a period of continued usage. With the elimination of such locking devices, the motor compartment of an automobile is not automatically protected upon the locking of the body of the car, thus permitting unauthorized opening of the hood and removal of relatively expensive components as the storage battery, heater, and the like. While it is known in the art to provide key-operated locks which penetrate the sheet metal forming the hood, such devices are difficult to install when not original equipment, and consequently have not found wide public acceptance.

It is therefore among the principal objects of the present invention to provide an improved hood locking device which may be readily installed in most automobiles by those possessing only ordinary skill, and using only ordinary tools.

Another object of the invention lies in the provision of an improved automobile hood locking device which may be adapted without modification to a wide variety of types of hood constructions, and which may be installed without any drilling or other machining operations.

A further object of the invention lies in the provision of an improved automobile hood locking device which may be unobtrusive when in installed condition, those components remaining visible being attractively finished so as to blend with the adjacent parts of the automobile.

Still another object of the inveniton lies in the provision of an improved automobile hood locking device which may not be readily tampered with, thus discouraging most potential thieves from attempting to break or otherwise damage the same.

A further object of the invention lies in the provision of an automobile hood locking device in which the cost of fabrication may be of a reasonably low order, with consequent wide sale, distribution and use.

A feature of the invention lies in the fact that the device may be formed almost entirely from stampings and other low cost components.

These objects and features, as well as other incidental ends and advantages, will more fully appear in the progress of the following disclosure, and be pointed out in the appended claim.

In the drawing, to which reference will be made in the specification, similar reference characters have been employed to designate corresponding parts throughout the several views.

FIGURE 1 is a fragmentary view in perspective showing an embodiment of the invention in installed and engaged condition.

FIGURE 2 is a similar fragmentary view in perspective showing the device in relatively unlatched condition.

FIGURE 3 is a view in elevation showing the device in latched condition.

FIGURE 4 is a side elevational view, as might be seen from the right-hand portion of FIGURE 3, but showing the device in unlatched condition.

In accordance with the invention, the device, generally indicated by reference character 10, comprises broadly: an upper clamp element 11, an elongated strap element 12, a lock-engaging loop element 13, a lock element 14, and lock element mounting means 15.

The upper clamp element 11 is preferably formed as a metallic stamping, and includes a strap element-engaging tongue 18, parallel side members 19 and 20 and interconnected by an end member 21. The side member 19 is provided with threaded bores 22 engaged by bolts 23 which extend across an interstice 24 to contact the oppositely disposed side member 20, and clamp any suitable projection therebetween, as will more fully appear.

The strap element 12 is preferably of a braided metallic type, so as not to be readily cut by any ordinary cutting instrument. The upper end 26 thereof is provided with a rivet 27, which interconnects the same with the tongue 18. The element 12 is bounded by first and second flat sides 28 and 29, respectively, as well as first and second end edges 30 and 31, respectively. The lower end 32 is provided with a rivet 33 by means of which the same is secured to the loop element 13.

The loop element 13 includes an outer side member 36, an inner side member 37, the lower end 32 of the strap element 12 being positioned between the members 36 and 37, all being penetrated by the rivet 33. The loop member 39 is secured to the inner surface of the inner side member 37, projecting therefrom so as to engage the lock element 14.

The lock element 14 may be of a type resembling conventional luggage hardware, including a face plate 43 having an opening 44 corresponding in configuration to the loop member 39. Positioned behind the opening 44 is a sliding latch member 45 operated by a lockable manually engageable actuating means 46. Extending through the face plate 43 are mounting holes 47.

The lock element mounting means 15 is preferably in the form of a back plate 50 having orifices 51 corresponding to the mounting holes 47 in the face plate member 43. The back plate 50 is interconnected with the face plate member by nuts and bolts 52—53 penetrating the holes 47 and orifices 51.

Referring to FIGURE 1 in the drawing, there is shown a conventional automobile hood in mounted condition upon an automobile. In FIGURE 2, there may be seen a transverse reinforcing member 56, the precise location of which will vary depending upon the shape and design of the hood, and the make of the automobile, but practically all hoods are provided with U-channel reinforcing means in a generally similar location, the same serving the purpose of preventing the relatively thin sheet metal hood from buckling. In installed condition, the upper clamp element 11 is secured to such a member, or a similar projecting flange. The hood is bounded by side edges 57 and 58, as well as a forward edge 59 which is selectively abuttable with the upper edge 61 of a radiator grill 60 when the hood is in closed condition. The grill 60 may be of any desired configuration, as, for example, that seen in FIGURES 1 and 2, to be bounded by a lower edge 52, side edges 63 and 64, and having a plurality of louvers 65 defining interstices 66 for the admission of air to a radiator (not shown).

In installing the lock element mounting means 15, the face plate member 43 is disposed outwardly of the grill 60, and the back plate 50 disposed inwardly thereof, the bolts 53 extending through the interstices 66 to be subsequently tightened. The location of the means 15 is determined by the effective length of the strap element 12 when the hood is in closed condition, the upper clamp element 11 preferably being mounted in such a manner that a minimum of the length of the strap element 12 is exposed. In the preferred form, the bolts 53 are preferably provided with screwdriver-engageable heads of the type permitting only a tightening action to be imparted thereto, so that removal or losening of the face plate member 43 is not easily accomplished.

As seen in FIGURE 1, when the device is closed a short length of strap element 12 extends over the front of the grill 60, the lower end being interconnected with the lock element 14. Where the strap element 12 is of braided metallic construction, it cannot be normally cut by a knife, scissors, or other simple cutting instrument, it being necessary to resort to a hack saw. Owing to the fact that the strap is unsupported for cutting in the areas over the interstices 66, such an operation is also not readily accomplished, so that, with proper installation, the device is substantially theft-proof.

I wish it to be understood that I do not consider the invention limited to the precise details of structure shown and set forth in this specification, for obvious modifications will occur to those skilled in the art to which the invention pertains.

I claim:

In combination, an automobile having a hood pivotally mounted at a rear edge thereof, a grill mounted beneath said hood, said hood having a forwardly disposed edge abuttable with an upper edge of said grill, a clamping element interconnected to said hood element at a point spaced from said rear edge thereof, a flat flexible elongated metallic strap element interconected at a first end thereof to said clamping element, separable locking means interconnected to said strap element at a second end thereof, and means interconnecting one part of said separable locking means to said grill.

References Cited in the file of this patent

UNITED STATES PATENTS

| | | |
|---|---|---|
| 274,788 | King | Mar. 27, 1883 |
| 1,296,301 | McClure | Mar. 4, 1919 |
| 2,537,380 | Travis | Jan. 9, 1951 |
| 2,892,495 | Hadden | June 30, 1959 |
| 2,992,551 | Cleveland | July 18, 1961 |